United States Patent [19]

Nakamura

[11] 4,076,394
[45] Feb. 28, 1978

[54] HINGES FOR A SPECTACLE FRAME

[75] Inventor: Iwao Nakamura, Sabae, Japan

[73] Assignee: Taiko Optical Kyogyo Kumiai, Sabae, Japan

[21] Appl. No.: 690,582

[22] Filed: May 27, 1976

[30] Foreign Application Priority Data

Sep. 17, 1975 Japan .............................. 50-128263[U]

[51] Int. Cl.² .............................................. G02C 5/22
[52] U.S. Cl. .................................. 351/153; 16/128 A; 351/121
[58] Field of Search ............. 16/128 A; 351/153, 141, 351/121

[56] References Cited

FOREIGN PATENT DOCUMENTS 1,113,590  9/1961  Germany .............................. 351/153

Primary Examiner—Paul A. Sacher
Assistant Examiner—Rodney B. Bovernick
Attorney, Agent, or Firm—Larson, Taylor and Hinds

[57] ABSTRACT

In a hinge for a spectacle frame comprising a stationary member having interconnecting elements projected therefrom, a swingable member having interconnecting elements projected therefrom, and a machine screw passing through the respective interconnecting elements, bushes are interposed between the machine screw and the interconnecting elements of the stationary member through which the machine screw passes.

3 Claims, 2 Drawing Figures

HINGES FOR A SPECTACLE FRAME

BACKGROUND OF THE INVENTION

The present invention relates to a spectacle frame and more particularly to hinges of a spectacle frame swingably connecting its bridge with its sides.

In conventional spectacle frames wearers often experience that machine screws connecting interconnecting elements respectively projecting from the stationary and swingable members of hinges of the spectacle frame, in particular, the machine screws of the right hand side hinge viewed from the wearer, are apt to come loose and unscrew due to the repeated folding and opening of the sides relative to the bridge.

This phenomenon is considered to be caused by the following reasons: In a conventional hinge comprising e.g. three interconnecting elements the machine screw of that side is generally introduced from the above in a hole formed in the uppermost interconnecting element of the stationary member of the hinge and a hole formed in the underlying interconnecting element of the swingable member to be screwed into the screwed hole formed in the lowermost interconnecting element of the stationary member, underlying the interconnecting element of the swingable member, so as to allow the swinging of the swingable member relative to the stationary member around the machine screw, and since the machine screw has such a relation with the respective interconnecting elements of both hinge members, when the swingable member is forced to swing relative to the stationary member as the side of the spectacle frame are swung relative to the bridge, the machine screw is forced to unscrew due to friction with the inner surface of the hole formed in the interconnecting element of the swingable member each time the sides are swung relative to the bridge.

Therefore, if such a friction occurring between the inner peripheries of the holes formed in the interconnecting elements of the swingable member and the outer periphery of the machine screw is reduced the unscrewing of the machine screw can be expected to be substantially retained.

SUMMARY OF THE INVENTION

It is an object of the present invention to provide a hinge for a spectacle frame which can effectively prevent its machine screw from coming unscrewed so as not loosen even though the sides of the frame are repeatedly subjected to opening and folding relative to the bridge of the frame.

According to the present invention a hinge for a spectacle frame is provided in which interconnecting elements projecting from the stationary member of the hinge and interconnecting element or elements projecting from the swingable member of the hinge are alternatively engaged with each other and a machine screw is inserted from the above in the aligning holes formed in the alternatively engaging interconnecting elements to be screwed into the undermost interconnecting element of the stationary member, whereby the inner diameter of the respective holes formed in the interconnecting element or elements of the swingable member are made somewhat larger than the outer diameter of the machine screw so that a bush or bushes are rotatably mounted in each of the holes with small clearances being left between the inner periphery of the hole and the outer periphery of the bush as well as the inner periphery of the bush and the outer periphery of the machine screw.

In one aspect of the present invention the bush has a height somewhat higher than the thickness of the interconnecting element of the stationary member so that in the assembled state the machine screw is kept tightened by the elastic compression of the bush, resulting in the prevention of its unscrewing.

BRIEF DESCRIPTION OF THE DRAWINGS

This and other objects of the present invention will become more readily apparent upon reading the following description taken in connection with the accompanying drawings, in which.

DESCRIPTION OF THE PREFERRED EMBODIMENTS

Figure 1:
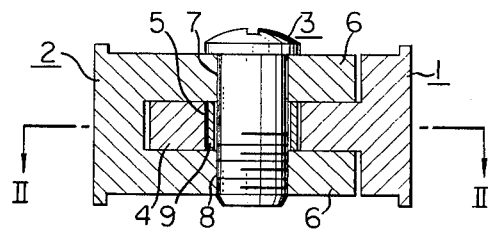
FIG. 1 shows a schematical vertical sectional view of one embodiment of the present invention.
Figure 2:
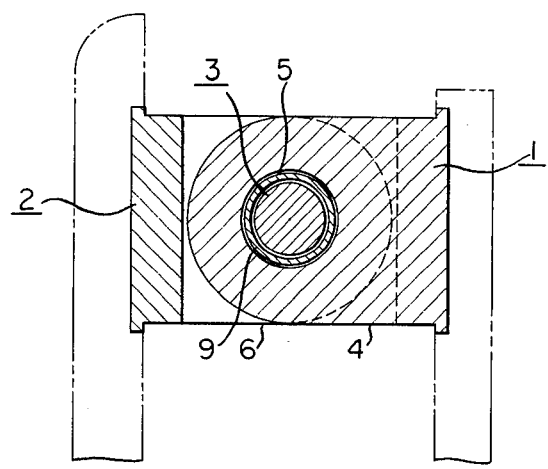
FIG. 2 shows a schematical horizontal sectional view taken along the line II—II of FIG. 1.

Referring now to FIGS. 1 and 2 of the drawings there is shown a hinge of a spectacle frame according to the present invention, wherein as an embodiment a hinge having three interconnecting elements is shown. It comprises a swingable member 1, a stationary member 2 and a machine screw 3. Swingable member 1 is provided with one interconnecting element 4 projected from one of its surfaces at right angles thereto, having generally a flat rectangular configuration with a semicircular outer edge and having a substantial thickness. Interconnecting element 4 of swingable member 1 is further formed with a central hole 5 perpendicular to the surface of the flat configuration. Stationary member 2 is provided with at least two interconnecting elements 6 projected from one of its surfaces at right angles thereto, each having substantially the identical configuration to interconnecting element 4 of swingable member 1 and adjoining interconnecting elements 6 are so spaced apart that interconnecting element 4 of stationary member 2 is snugly received therebetween. Upper interconnecting elements 6 of stationary member 2 is formed with a hole 7 so as to align with hole 5 of interconnecting element 4 of swingable member 1, the inner diameter of hole 7 substantially corresponding to the outer diameter of machine screw 3, whereas the lower interconnecting element of stationary member 2 is formed with a screwed hole 8 to be screwed into the screw portion of machine screw 3 formed near its end portion. In this case, it should be noticed that the inner diameter of hole 5 formed in interconnecting element 4 of swingable member 1 is made substantially larger than the outer diameter of machine screw 3 so that hole 5 rotatably receives a bush 9 which is rotatably fitted on machine screw 3, in other words, bush 9 is received in hole 5 with small plays being left not only between the outer periphery of bush 9 and the inner periphery of hole 5, but also between the inner periphery of bush 9 and the outer periphery of machine screw 3. However, care should be taken that the plays are selected to be so small that no substantial slackness can be observed between the sides and the bridge of the spectacle frame when the hinges are assembled in the spectacle frame.

In a preferred embodiment stationary member 2 including interconnecting elements 6 and swingable member 1 including interconnecting element 4 as well as bush 9 are made of nickel silver, whereas machine screw stainless steel. When the hinges for a spectacle frame according to the present invention having such a constitution, after being incorporated with the spectacle frame, are subjected to swinging by the opening and folding of the sides of the frame relative to its bridge, relative shifts occur in the respective hinges not only between the inner periphery of bush 9 and the outer periphery of machine screw 3, but also between the outer periphery of bush 9 and the interperiphery of hole 5 of interconnecting element 4 of swingable member 1 of the hinge due to the friction between the relatively shifting parts. Thus, it will be appreciated that, on opening and folding the sides of the spectacle frame relative to the bridge, since the relative shifts arise at two portions, the amount of possible unscrewing of machine screw 3 occurring every time the sides are swung, is made remarkably less than the case where machine screw 3 comes directly into contact with the inner periphery of hole 5 of interconnecting element 4 of swingable member 1, without bush 9 being intervened therebetween.

Accordingly, the loosening of machine screw 3 is effectively retained compared with the case where conventional hinges are used in which the machine screw is directly in contact with the inner periphery of the hole formed in the interconnecting element of the swingable member.

Further, in the present invention it is also intended that the height of bush 9 is made somewhat larger than the thickness of interconnecting element 4 of swingable member 1 of the hinge. If this is the case, bush 9 is firmly secured between the confronting surfaces of the adjoining set of interconnecting elements 6 of stationary member 2 of the hinge when the hinge is assembled, so that machine screw 3 is kept always tensioned even though interconnecting element 4 of swingable member 1 of the hinge is swung relative to interconnecting elements 6 of stationary member 2.

Although the present invention has been described and shown above as the stationary member of the hinge having two interconnecting elements and the swingable member having one interconnecting elements it should be appreciated that the present invention will be similarly applicable to hinges having a number of respective interconnecting elements other than those exemplified above.

What is claimed is:

1. A hinge for a spectacle frame comprising a stationary member having at least two interconnecting elements projecting therefrom, a swingable member having at least one interconnecting element projecting therefrom and respectively introduced into the respective gaps formed between adjoining sets of said interconnecting elements of said stationary member, a machine screw inserted from the above in aligning holes formed in each of said interconnecting elements of said stationary and swingable members and screwed in the undermost one of said interconnecting elements of said stationary member, and at least one bush rotatably mounted in the hole formed in said at least one interconnecting element of said swingable member, the inner diameters of each of said holes being respectively made somewhat larger than the outer diameter of said machine screw, and the inner diameter of said at least one bush being made somewhat larger than the outer diameter of said machine screw said bush being mounted so as to leave small clearances between the inner periphery of said bush and the outer periphery of said machine screw and between the inner periphery of said hole in the inter-connecting element and the outer periphery of said bush.

2. A hinge for spectacle frame as claimed in claim 1 wherein the height of said at least one bush is respectively substantially the same as the thickness of said at least one interconnecting element of said swingable member, respectively.

3. A hinge for a spectacle frame as claimed in claim 1 wherein the height of said at least one bush is made somewhat larger than the thickness of said at least one inter-connecting element of said swingable member, respectively.

* * * * *